United States Patent
Keech

(10) Patent No.: US 10,274,352 B2
(45) Date of Patent: Apr. 30, 2019

(54) METHOD AND APPARATUS FOR INTERFERENCE REDUCTION

(71) Applicant: ABB Limited, Stonehouse, Gloucestershire (GB)

(72) Inventor: Ray Keech, Stonehouse (GB)

(73) Assignee: ABB Limited, Stonehouse, Gloucestershire (GB)

( * ) Notice: Subject to any disclaimer, the term of this patent is extended or adjusted under 35 U.S.C. 154(b) by 162 days.

(21) Appl. No.: 15/268,911

(22) Filed: Sep. 19, 2016

(65) Prior Publication Data

US 2017/0082468 A1  Mar. 23, 2017

(30) Foreign Application Priority Data

Sep. 21, 2015 (GB) .................................. 1516706.7

(51) Int. Cl.
*G06F 11/30* (2006.01)
*G01F 1/58* (2006.01)
(Continued)

(52) U.S. Cl.
CPC ................ *G01F 1/584* (2013.01); *G01F 1/60* (2013.01); *H04L 25/08* (2013.01); *H04L 43/028* (2013.01); *H04L 5/06* (2013.01)

(58) Field of Classification Search
CPC ...................................................... G01F 1/60
See application file for complete search history.

(56) References Cited

U.S. PATENT DOCUMENTS

| 4,773,274 A | 9/1988 | Kobayashi et al. |
| 2003/0029249 A1 | 2/2003 | Keech |

(Continued)

FOREIGN PATENT DOCUMENTS

| EP | 2372317 A1 | 10/2011 |
| GB | 2271639 A | 4/1994 |

(Continued)

OTHER PUBLICATIONS

Pekka et al: "Periodic Interference Rejection Using Coherent Sampling and Waveform Estimation", IEEE Transactions on Circuits and Systems, IEEE, US, vol. Cas-31, No. 5, May 1, 1984 (May 1, 1984), pp. 438-446, XP002668491, ISSN: 0098-4094, DOI: 10-1109/TCS. 1984.1085529 (hereinafter "Pekka").*

(Continued)

*Primary Examiner* — Phuong Huynh
(74) *Attorney, Agent, or Firm* — Merchant & Gould P.C.

(57) ABSTRACT

A method and apparatus are for processing a periodic data-carrying signal to reduce periodic interference at either of a first fundamental frequency or a second fundamental frequency, the second fundamental frequency being different from the first fundamental frequency. The periodic data-carrying signal is derived from an excitation signal having an excitation frequency, the excitation frequency being a sub-multiple of the first fundamental frequency. The data-carrying signal is subjected to both a comb filter to reject interference at the first fundamental frequency, and an averaging/integrating filter to reject interference at the second fundamental frequency. A comb filter delay period is related to the first fundamental frequency and the averaging/integrating filter averages or integrates over a period related to the second fundamental frequency.

23 Claims, 4 Drawing Sheets

(51) Int. Cl.
  *H04L 25/08*  (2006.01)
  *H04L 12/26*  (2006.01)
  *G01F 1/60*   (2006.01)
  *H04L 5/06*   (2006.01)

(56) References Cited

U.S. PATENT DOCUMENTS

2004/0035180 A1  2/2004  Okuda
2004/0189322 A1  9/2004  Pearson et al.
2010/0300211 A1  12/2010 Sugawara et al.
2015/0234076 A1  8/2015  Overby

FOREIGN PATENT DOCUMENTS

| GB | 2333161      | * | 7/1999  |
| GB | 2333161 A    |   | 7/1999  |
| JP | S60-174915 A |   | 9/1985  |
| JP | H10-111157 A |   | 4/1998  |
| JP | 2003-344127 A|   | 12/2003 |
| JP | 2005-345166 A|   | 12/2005 |

OTHER PUBLICATIONS

Search Report for GB 15167067, dated Mar. 21, 2016.
Heinonen et al., "Periodic Interterence Rejection Using Coherent Sampling and Waveform Estimation", IEEE Transactions on Circuits and Systems, Cas-31(5):438-446 (1984).
Office Action for European Patent Application No. 16189725, dated Feb. 12, 2018.
European Search Report for EP 16189725, dated Mar. 8, 2017.

* cited by examiner

METHOD AND APPARATUS FOR INTERFERENCE REDUCTION

This application claims benefit of 1516706.7, filed 21 Sep. 2015 in the Great Britain, which application is incorporated herein by reference. To the extent appropriate, a claim of priority is made to the above disclosed application.

FIELD OF THE INVENTION

This invention relates to a method and apparatus for the reduction of periodic interference in data-carrying signals produced from, or otherwise dependent upon, a periodic energising or excitation signal. For example, the invention is particularly but not exclusively applicable to electromagnetic flowmeters, and will primarily be described in that context, although many other applications are also possible.

BACKGROUND TO THE INVENTION

Pulsed drive electromagnetic flowmeters rely upon Faraday's law, i.e. the voltage induced across a conductor as it moves at right angles through an electromagnetic field will be proportional to the velocity of that conductor. In the case of an electromagnetic flowmeter the conductor is the fluid and its velocity is inferred from the voltage induced across the flowing fluid.

With a pulse drive electromagnetic flowmeter the designer of the flowmeter has control over the energisation of the electromagnetic field. Usually the energising coils are driven at a constant current with alternating polarities, the frequency of which is under the control of the designer.

The signal levels generated by the flowmeter as a result of the flowing fluid are typically very low, for example ranging from nV to a few mV, and consequently interference rejection is very important. It is the rejection of periodic interference, such as mains-power related interference, which is the purpose of embodiments of this invention.

In practice, mains frequency interference may arise for example from pump or other machinery drives in the vicinity of the flowmeter, and thus is likely to be a problem in many industrial environments in which such flowmeters may be installed.

It is industry standard practice to ensure that any signal processing rejects interference from the mains frequency and its harmonics. However, from a product manufacturing perspective, this is complicated by mains frequencies differing from country to country around the world. In this respect, two mains frequencies predominate, namely 50 Hz and 60 Hz.

Current practice for signal processing is for the mains frequency to be set in the device, typically to either 50 Hz or 60 Hz. For instruments which are powered from a mains supply the mains frequency can be detected by the device itself, and consequently the interference (i.e. at the detected mains frequency and harmonics thereof) can be readily determined and rejected. However, for modern instruments, powered from say batteries or renewable energy sources, the device may have no way of determining the local mains frequency, making reliable detection and rejection of mains frequency interference difficult.

If a device is manufactured for sale worldwide, the intended mains frequency for the intended country of use can be set in the device at the point of manufacture, but if the device is ultimately used in another country in which the mains frequency is different (for example due to a shipping error by a third party reseller) then this can lead to interference problems and measurement inaccuracies. Alternatively, the mains frequency may by set the end user, e.g. at the point of installation, although the user may inadvertently fail to do this, again resulting in interference problems and measurement inaccuracies during use.

In the case of electromagnetic (EMF) flowmeters, interference rejection may be obtained by setting the coil excitation frequency to a sub-multiple of the mains frequency, such as one quarter of the mains frequency. For example, for 50 Hz mains frequency a coil drive of say 12.5 Hz (50 Hz/4) is typical, whereas for 60 Hz mains frequency it may be set to 15 Hz (60 Hz/4). However, as discussed above, if for any reason the instrument is operated with a local mains frequency other than that for which the device has been set, the rejection systems are unable to reject the mains related interference, and readings produced by the flowmeter can consequently be inaccurate and/or unstable.

There is therefore a desire to improve the design of such devices so as to prevent or at least mitigate such problems from occurring, for instance in the event that the mains frequency as set in the device does not correctly correspond to the local mains frequency.

SUMMARY OF THE INVENTION

According to a first aspect of the present invention there is provided a method of processing a periodic data-carrying signal to reduce periodic interference at either of a first fundamental frequency or a second fundamental frequency, the second fundamental frequency being different from the first fundamental frequency, the periodic data-carrying signal being derived from an excitation signal having an excitation frequency, the excitation frequency being a sub-multiple of the first fundamental frequency, the method comprising: subjecting the data-carrying signal to both a comb filter operation to reject interference at the first fundamental frequency, and an averaging/integrating filter operation to reject interference at the second fundamental frequency: wherein the comb filter operation has a comb filter delay period related to the first fundamental frequency; and wherein the averaging/integrating filter operation averages or integrates over a period related to the second fundamental frequency.

In such a manner, the comb filter operation is able to reject interference at the first fundamental frequency whilst allowing the periodic data-carrying signal to pass (by virtue of the excitation frequency, from which the periodic data-carrying signal is derived, being a sub-multiple of the first fundamental frequency), and the averaging/integrating filter operation is able to reject interference at the second fundamental frequency. Accordingly, interference at either of the first fundamental frequency or the second fundamental frequency is reduced or eliminated, without the system needing to be set in advance as to which one of the first and second fundamental frequencies is expected to be the frequency of the interference (for example, the local mains frequency).

The references herein to comb filter operations, comb filters and such like should be interpreted broadly, to encompass any suitable arrangement in which a signal is combined with a delayed version of itself, thereby resulting in one or more "notches" in the frequency domain, at which a corresponding frequency component will be rejected from the signal.

Likewise, the references herein to averaging/integrating filter operations, averaging/integrating filters and such like should also be interpreted broadly, to encompass any suitable arrangement in which a signal is averaged or integrated over a period of time in order to produce an output signal.

The expression "sub-multiple" as used herein should be interpreted in such a manner as to encompass sub-multiples obtained by dividing the frequency in question by a number that is not exactly an integer but is sufficiently close to an integer so as to make no significant difference to the operation and effectiveness of the filtering process.

The excitation frequency may be given by:

(the first fundamental frequency)/$n$, where n is an integer.

As mentioned above, n (and likewise other integer values mentioned herein) need not be exactly an integer but could be a number sufficiently close to an integer so as to make no significant difference to the operation and effectiveness of the filtering process.

Further, the comb filter delay period may be given by:

$1/(2 \times$ the excitation frequency)

or $1/$(the excitation frequency).

In embodiments, this allows the desired periodic data-carrying signal to pass through the comb filter operation substantially without attenuation, since the excitation frequency from which the data-carrying signal is derived corresponds to a frequency at which the comb filter provides a substantially flat passband.

Further, the averaging/integrating filter operation may average or integrate over a period given by:

$m/$(the second fundamental frequency), where m is an integer.

Preferably the comb filter operation further rejects interference at harmonics of the first fundamental frequency.

Preferably the averaging/integrating filter operation further rejects interference at harmonics of the second fundamental frequency.

The comb filter operation may precede the averaging/integrating filter operation. Alternatively, the averaging/integrating filter operation may precede the comb filter operation.

According to certain practical applications the data-carrying signal may be produced by an electromagnetic flowmeter. Further, the above method may be performed by said flowmeter. Alternatively the method may be performed by a signal processing device or a signal processing circuit separate from the device (e.g. flowmeter) that produces the data-carrying signal.

According to a second aspect of the present invention there is provided apparatus for processing a periodic data-carrying signal to reduce periodic interference at either of a first fundamental frequency or a second fundamental frequency, the second fundamental frequency being different from the first fundamental frequency, the periodic data-carrying signal being derived from an excitation signal having an excitation frequency, the excitation frequency being a sub-multiple of the first fundamental frequency, the apparatus comprising: a comb filter in series with an averaging/integrating filter, wherein the comb filter is configured to reject interference at the first fundamental frequency from the data-carrying signal, and the averaging/integrating filter is configured to reject interference at the second fundamental frequency from the data-carrying signal; wherein the comb filter has a comb filter delay period related to the first fundamental frequency; and wherein the averaging/integrating filter is configured to average or integrate over a period related to the second fundamental frequency.

As discussed above, the excitation frequency may be given by:

(the first fundamental frequency)/$n$, where n is an integer.

The comb filter delay period may be given by:

$1/(2 \times$ the excitation frequency)

or $1/$(the excitation frequency).

The averaging/integrating filter may be configured to average or integrate over a period given by:

$m/$(the second fundamental frequency), where m is an integer.

Preferably the comb filter is further configured to reject interference at harmonics of the first fundamental frequency.

Preferably the averaging/integrating filter is further configured to reject interference at harmonics of the second fundamental frequency.

The comb filter may precede the averaging/integrating filter. Alternatively, the averaging/integrating filter may precede the comb filter.

The apparatus may further comprise a signal generator configured to generate the excitation signal. For example, according to certain practical applications the apparatus may be an electromagnetic flowmeter, the data-carrying signal being produced by said flowmeter in use. Alternatively the apparatus may be a signal processing device or a signal processing circuit operable to receive and process a data-carrying signal produced by a device such as an electromagnetic flowmeter.

With respect to both the first and second aspects of the invention, according to certain embodiments designed to reduce the effects of 50 Hz or 60 Hz mains-related interference, the first fundamental frequency may be 50 Hz and the second fundamental frequency may be 60 Hz. Alternatively, the first fundamental frequency may be 60 Hz and the second fundamental frequency may be 50 Hz.

The excitation signal may have an alternating form, for example selected from a group comprising: a square wave, a non 50:50 pulse, a sine wave, a triangular wave, a saw-tooth wave.

According to a further aspect of the present invention there is provided a method of processing a periodic data-carrying signal to reduce periodic interference at either of a first fundamental frequency or a second fundamental frequency, the second fundamental frequency being different from the first fundamental frequency, the periodic data-carrying signal being derived from an excitation signal having an excitation frequency, the excitation frequency being a sub-multiple of the first fundamental frequency, the method comprising: subjecting the data-carrying signal to both a comb filter operation to reject interference at the first fundamental frequency, and an averaging/integrating filter operation to reject interference at the second fundamental frequency.

According to a yet further aspect of the present invention there is provided apparatus for processing a periodic data-carrying signal to reduce periodic interference at either of a first fundamental frequency or a second fundamental frequency, the second fundamental frequency being different from the first fundamental frequency, the periodic data-carrying signal being derived from an excitation signal having an excitation frequency, the excitation frequency being a sub-multiple of the first fundamental frequency, the apparatus comprising: a comb filter in series with an averaging/integrating filter, wherein the comb filter is configured to reject interference at the first fundamental frequency from the data-carrying signal, and the averaging/integrating filter is configured to reject interference at the second fundamental frequency from the data-carrying signal.

BRIEF DESCRIPTION OF THE DRAWINGS

Embodiments of the invention will now be described, by way of example only, and with reference to the drawings in which.

In the figures, like elements are indicated by like reference numerals throughout.

DETAILED DESCRIPTION OF PREFERRED EMBODIMENTS

The present embodiments represent the best ways known to the applicants of putting the invention into practice. However, they are not the only ways in which this can be achieved.
Overview The present embodiments provide a signal processing method and apparatus capable of eliminating or at least reducing, from a periodic data-carrying signal, periodic interference at either of two predetermined frequencies, and associated harmonics thereof, dependent upon a periodic energising or excitation signal.

More particularly, the signal processing method and apparatus are configured to reject both of the two predetermined frequencies, and associated harmonics thereof.

In a presently-preferred embodiment, the signal processing method and apparatus are configured to reject both 50 Hz and 60 Hz mains interference, together with all associated harmonics.

In broad terms, this is achieved by provided first filtering means configured to reject one of the two predetermined frequencies (e.g. 50 Hz mains) and its associated harmonics, and second filtering means configured to reject the other of the two predetermined frequencies (e.g. 60 Hz mains) and its associated harmonics.

Figure 1:
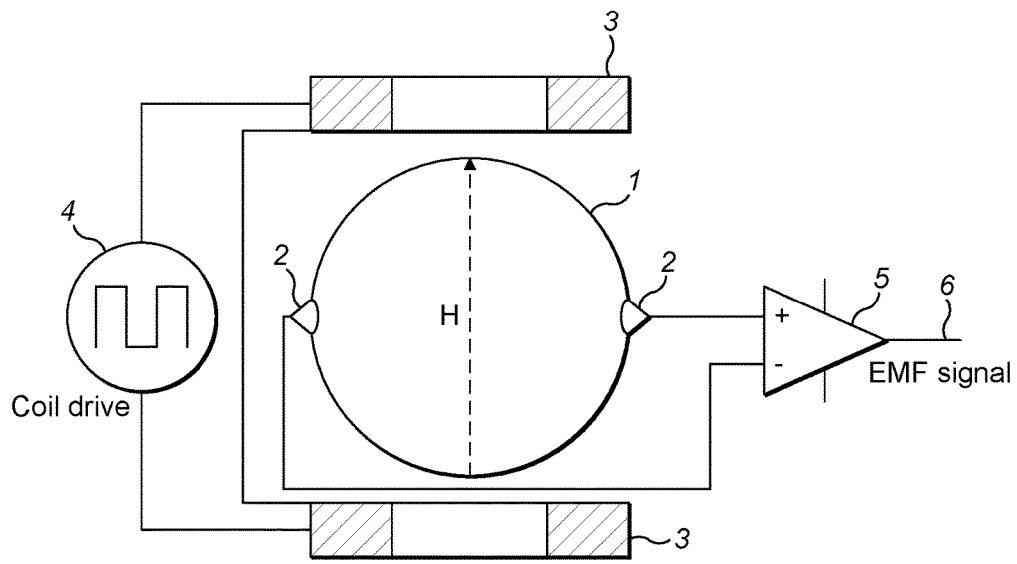
FIG. 1 is a diagrammatic cross-section of a typical electromagnetic flowmeter showing a coil drive and a signal amplifier.

Consequently, if the data-carrying signal is subjected to interference at either of the two predetermined frequencies, the interference will be reduced, without the apparatus needing to be set in advance as to which one of the two predetermined frequencies (e.g. the local mains frequency) is likely to be the cause of the interference.
Flowmeter Context The present embodiments will be described in the context of electromagnetic (EMF) flowmeters, although the present principles have many other areas of application. To provide some background in respect of flowmeters, FIG. 1 shows a pipe 1 which contains flowing fluid and has positioned around it a pair of coils 3 wired in series. A periodic square wave constant current generator 4 is connected to the two coils 3, thereby generating an alternating magnetic field H across the pipe 1. The direction of the field reverses each time the polarity of the excitation signal (from generator 4) changes. The movement of the fluid through the magnetic field generates a voltage between sensor electrodes 2, the polarity of which also changes with that of the excitation signal. An output 6 from differential amplifier 5 contains the alternating square wave, whose amplitude corresponds to the liquid flow velocity in the pipe 1. The output 6 also potentially contains interference signals as described herein.
Signal Processing Principles One technique commonly used in many measuring instruments is to average any measured signal over 100 ms or integer multiples of 100 ms. This technique is not commonly used with electromagnetic flowmeters as it limits the coil excitation frequency to a maximum of 5 Hz (=1/(2×100 ms). For primarily signal to noise reasons, it is normally desirable to run electromagnetic flowmeter coil excitation frequencies faster than 5 Hz.

Therefore, in presently-preferred embodiments of the present method and apparatus, the signal processing uses a comb filter in combination with an averaging filter, where the comb filter is used to reject one of the two predetermined frequencies (e.g. 50 Hz mains) and its associated harmonics, and the averaging filter is used to reject the other of the two predetermined frequencies (e.g. 60 Hz mains) and its associated harmonics. The comb filter and the averaging filter thereby act, respectively, as the first and second filtering means mentioned above.

A comb filter exists in many forms, but for one embodiment (described in more detail below) a simple subtractive feed forward form is used, where the comb filter output equals the delayed version of the input signal subtracted from the input signal, as defined by:

$$y(n)=x(n)-x(n-K)$$

where:

$y(n)$=output
$x(n)$=input
$K$=delay

For the case of an electromagnetic flowmeter, the said signal processing comb filter subtracts successive half-cycles of the data signal from successive half-cycles of the data signal of opposite polarity. It will be understood that the term "polarity" is used with reference to the coil drive polarity. In the recovered input signal the baseline may not be zero due to DC offset. Thus, half-cycles of the data signal, whilst alternately positive-going and negative-going relative to the baseline (and thus of opposite polarity relative thereto), may not necessarily be of opposite polarity in absolute terms.

In one embodiment, the coil drive excitation frequency is set to a sub-multiple of a first one of the two predetermined mains frequencies from which interference may be caused. Thus, $$\text{coil drive frequency} = \text{"mains frequency 1"}/n \qquad [1]$$

where n is an integer.

The comb filter delay K is then set equal to the coil drive half cycle period. That is to say, $$K = 1/(2 \times \text{coil drive frequency}) \qquad [2]$$

For example, let us take "mains frequency 1" to be 50 Hz. The coil drive frequency may therefore be set to 25 Hz (using equation [1] above and taking integer n as being 2). In turn, this gives a coil drive half cycle period of 20 ms (using equation [2] above). With the signal processing comb filter delay K being set to this value, 20 ms, this comb filter will have a notch at the following frequencies:

50 Hz, 100 Hz, 150 Hz, 200 Hz, 250 Hz, 300 Hz, 350 Hz, . . . thereby rejecting unwanted interference at, in this case, 50 Hz (the first predetermined mains frequency) and all its associated harmonics.

Recovery of the wanted coil drive frequency of 25 Hz (which may for example be in the form of a square wave signal) is straightforward as the comb filter has a substantially flat passband at the following frequencies:

25 Hz, 75 Hz, 125 Hz, 175 Hz, 225 Hz, . . .

Consequently, all odd harmonics of the wanted signal are passed, leading to no amplitude distortion of the recovered signal and allowing an accurate determination of the recovered amplitude—which for an EMF flowmeter corresponds to the desired measured flow velocity.

The second (i.e. alternate one) of the two predetermined mains frequencies, which we will refer to as "mains frequency 2", is rejected by means of an averaging filter, whereby the averaging time period is given by:

$$\text{averaging period} = m/\text{"mains frequency 2"} \qquad [3]$$

where m is an integer

In one embodiment, the averaging period is set equal to one cycle of the "mains frequency 2". So for the case of "mains frequency 2"=60 Hz, an averaging period of 16.7 ms is used (from equation [3] above, and taking integer m as being 1). This has the desired effect of rejecting all of the following frequencies:

60 Hz, 120 Hz, 180 Hz, 240 Hz, 300 Hz, 360 Hz, . . .

Thus, 60 Hz and all its associated harmonics would be rejected.

Example Circuitry

Figure 2:
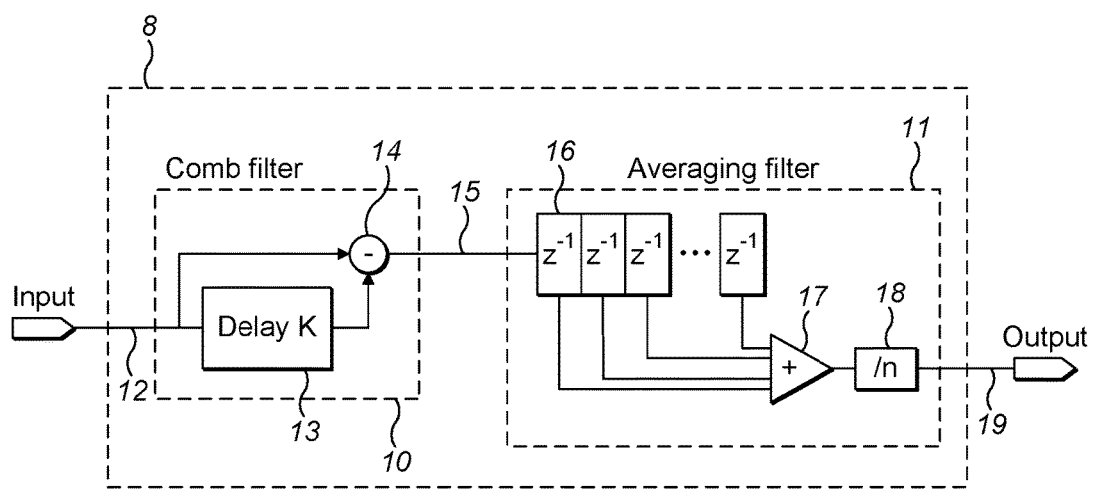
FIG. 2 illustrates an embodiment of a dual-frequency interference reduction circuit, including a comb filter and an averaging filter.

Referring now to FIG. 2, this shows an embodiment of a dual-frequency interference reduction circuit 8 configured to implement the principles as outlined above, including a comb filter 10 to reject the first of the two predetermined frequencies (e.g. 50 Hz mains) and its associated harmonics, and an averaging filter 11 to reject the second of the two predetermined frequencies (e.g. 60 Hz mains) and its associated harmonics.

The interference reduction circuit 8 may be incorporated in the device which produces the data-carrying signal (e.g. within an electromagnetic flowmeter, as described further in relation to FIG. 8 below). Alternatively the interference reduction circuit 8 may be provided in a separate signal processing device configured to receive the data-carrying signal (e.g. from an electromagnetic flowmeter) and to remove interference from the data-carrying signal.

For illustration purposes the following discussion refers to the processing of a data-carrying signal produced by an electromagnetic flowmeter, although other applications are of course possible.

Figure 3:
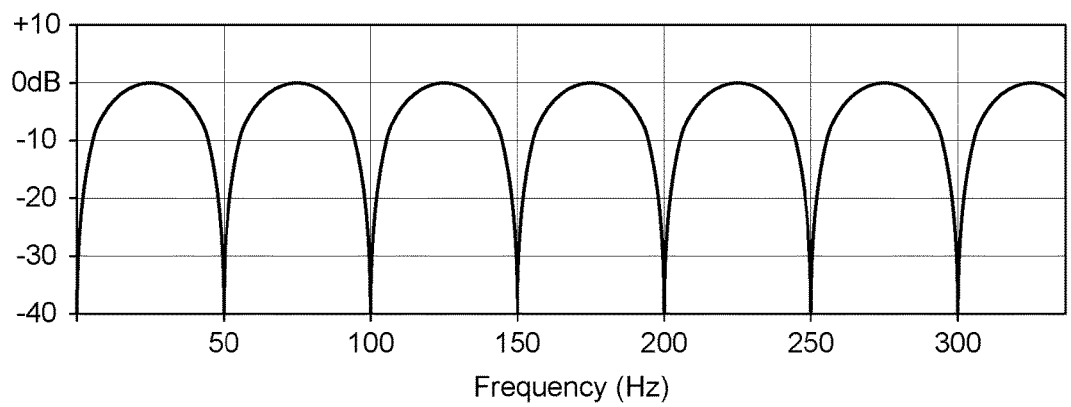
FIG. 3 illustrates an example of a typical feed forward subtraction comb filter frequency response, filtering at 50 Hz and harmonics thereof.

The flow signal with its unwanted periodic interference is present at signal 12. The signal is first processed by the comb filter 10, which is shown as a feed forward type which comprises a signal delay K and a subtract function 14. For illustration purposes, if the coil drive frequency (or excitation frequency) of the magnetic field excitation generator (e.g. generator 4 in FIG. 1) is set to 25 Hz, then setting the delay value K (reference numeral 13 in FIG. 2) of the comb filter to 20 ms will result in rejection of periodic (e.g. mains-related) interference at 50 Hz and all of its higher frequency harmonics. This is illustrated in FIG. 3, showing signal rejection at the following frequencies:

50 Hz, 100 Hz, 150 Hz, 200 Hz, 250 Hz, 300 Hz, . . .

The comb filter 10 passes the required measurement frequencies, which in the case of a square wave drive electromagnetic flowmeter are the fundamental frequency plus the associated odd harmonics—i.e. for the above example (25 Hz drive) are:

25 Hz, 75 Hz, 125 Hz, 175 Hz, 225 Hz, 325 Hz, . . .

As shown in FIG. 3, the substantially flat passband of the comb filter 10 at these frequencies enables the amplitude of the measurement signal to be accurately recovered, in order to measure the liquid flow velocity.

Referring again to FIG. 2, the output 15 from the comb filter 10 is fed into an averaging or integrating filter 11. In this illustration the averaging or integrating filter 11 is shown as a multi-point sample tap, where each time sample is stored in respective taps 16. The number of taps depends on the sampling frequency. In this example, and as discussed above, with a view to rejecting periodic interference at 60 Hz and its higher frequency harmonics, the total time of all the taps 16 is set to 16.7 ms (i.e. 1/60 Hz). The samples are summed by the adder 17, then normalised by the number of samples in the tap by the divider 18. Here the output 19 is averaged over, in this case, one complete mains cycle (i.e. 16.7 ms for 60 Hz mains). This will reject periodic interference at 60 Hz and all of its higher frequency harmonics.

The output 19 from the averaging filter 11 is the recovered square wave corresponding to the wanted flow signal, with its amplitude being directly proportional to the flow velocity in the pipe. Thus, the present combination of the comb filter 10 and the averaging filter 11 enables rejection of, in this example, both 50 Hz and 60 Hz interference, together with all higher order interference harmonics.

In an alternative embodiment, the comb filter 10 and averaging filter 11 can be revered in order, with the averaging filter 11 being placed before the comb filter 10.

Figure 8:
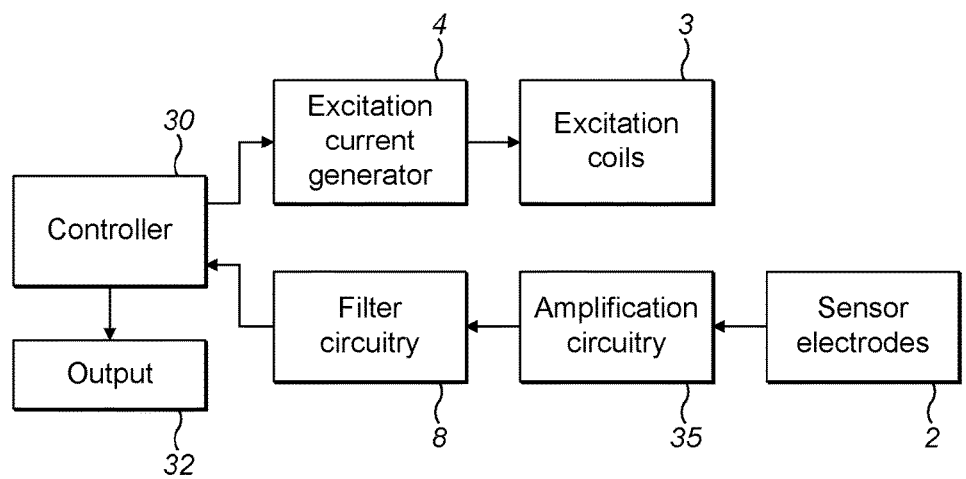
FIG. 8 is a schematic illustration of a flowmeter circuit including interference reduction circuitry (filter circuitry) of the kind as illustrated in FIG. 2.

FIG. 8 is a schematic illustration of a flowmeter circuit including interference reduction circuitry (filter circuitry) 8 as described above. The circuit is controlled by a controller 30, which is typically a suitably-programmed microprocessor (having associated memory, a power supply, etc., as those skilled in the art will appreciate). The controller 30 is configured to control the excitation current generator 4, to cause the excitation current generator 4 to supply an alternating excitation current to the excitation coils 3 and thereby generate an alternating magnetic field (as described above with reference to FIG. 1).

In use, movement of fluid through the magnetic field generates a voltage between sensor electrodes 2. This voltage is amplified by amplification circuitry 35 (e.g. comprising differential amplifier 5 as described above) and the resulting signal is then processed by the interference reduction circuitry 8. Following the filtering of interference, the resulting signal is then processed by the controller 30 (e.g. employing synchronous demodulation) to provide an output 32 representative of the flow velocity of the fluid.

Modelling Demonstration

FIGS. 4 to 7 demonstrate (using computer-based modelling) the ability of the circuit of FIG. 2 to reduce interference at either of two fundamental frequencies from an input flow signal. For the purposes of this demonstration, and by way of example only, 50 Hz and 60 Hz are used as the two fundamental frequencies, and a 25 Hz (coil drive excitation frequency) square wave is used as the input flow signal.

Figure 4:
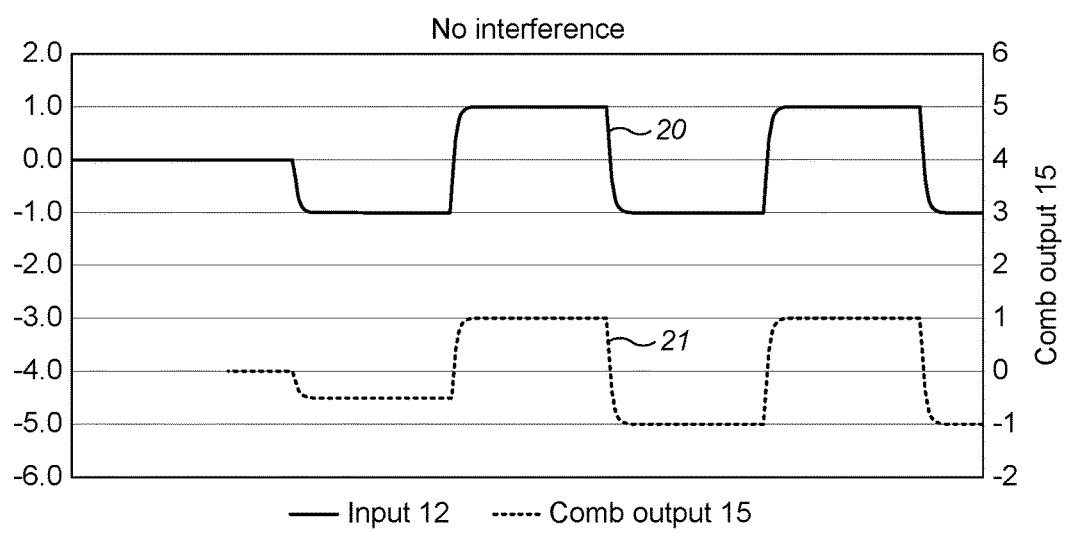
FIG. 4 illustrates a 25 Hz flow signal (amplitude as a function of time) as input to the interference reduction circuit of FIG. 2, when subjected to no interference, and the resulting output of the comb filter.

Referring initially to FIG. 4, this illustrates an input flow signal 20 (amplitude as a function of time), as input to the interference reduction circuit of FIG. 2 in the absence of interference, and the resulting output of the comb filter 10. Thus, the input signal 20, which corresponds to signal 12 in FIG. 2 and is of the same general form as the excitation coil current generated by generator 4 in FIG. 1, shows the flow velocity signal with no interference. In FIG. 4 the comb filter output signal 21 is of the same form as the input signal 20, apart from the first excitation cycle where the output is at half amplitude due to incomplete population of the comb filter delay line with the continuous mode drive signal.

Figure 5:
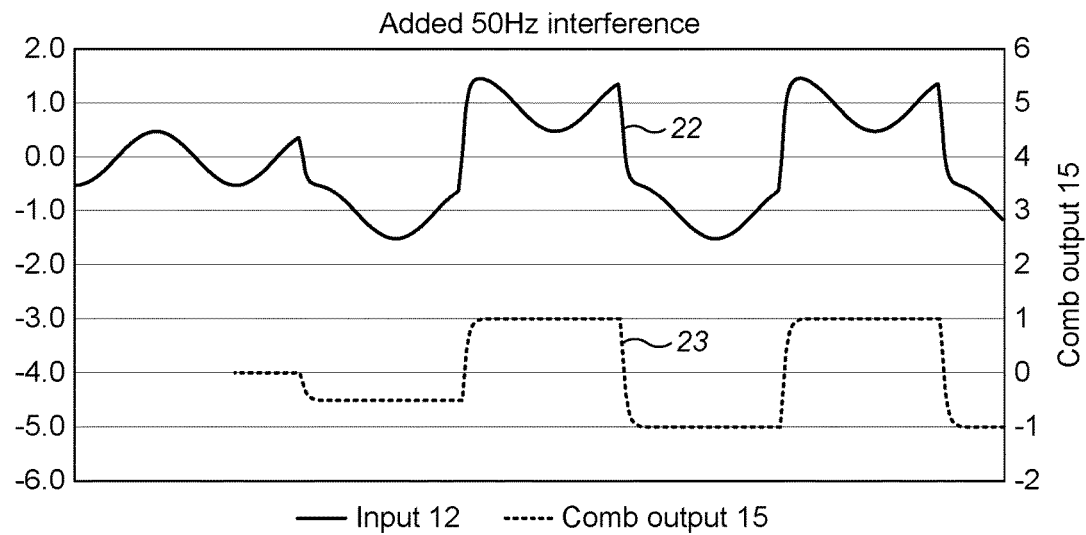
FIG. 5 illustrates a similar input flow signal to that of FIG. 4, again as input to the interference reduction circuit of FIG. 2, but in this case subjected to 50 Hz interference, and the resulting output of the comb filter.

Turning now to FIG. 5, this was obtained under the same conditions as FIG. 4, using the interference reduction circuit of FIG. 2, but with the input signal 22 being subjected to 50 Hz interference. It can be seen from FIG. 5 that the comb filter 10 has removed all traces of this 50 Hz interference, resulting in a comb filter output signal 23 which is the same as output signal 21 in FIG. 4.

Figure 6:
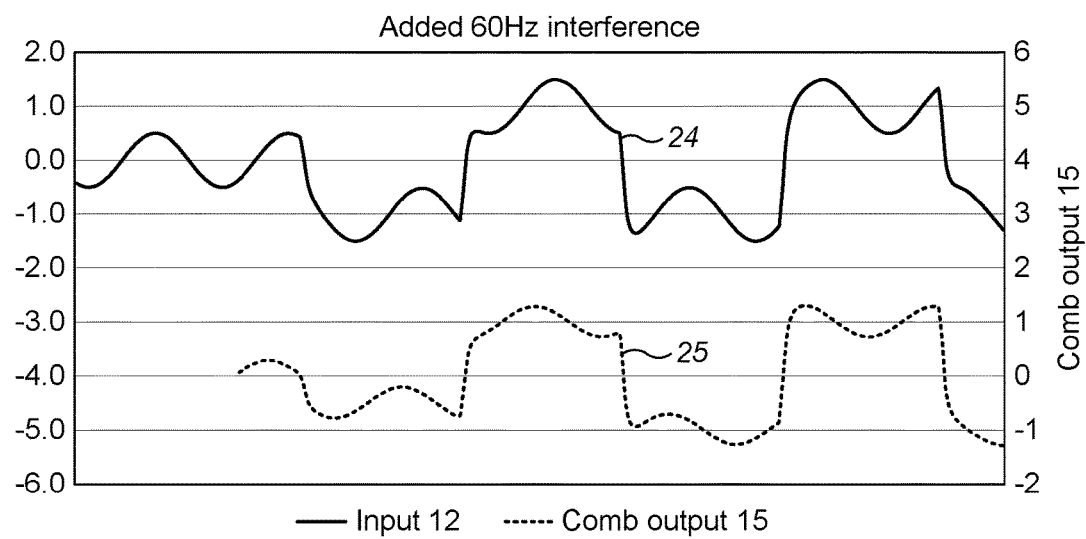
FIG. 6 illustrates a similar input flow signal to that of FIG. 4, again as input to the interference reduction circuit of FIG. 2, but in this case subjected to 60 Hz interference, and the resulting output of the comb filter.

Referring now to FIG. 6, this was produced under the same conditions as FIGS. 4 and 5, again using the interference reduction circuit of FIG. 2, but with the interference frequency having been changed to 60 Hz. From the comb filter output signal 25 in FIG. 6 it can be seen that the first stage comb filter 10 has little effect on the 60 Hz component of the input signal.

Figure 7:
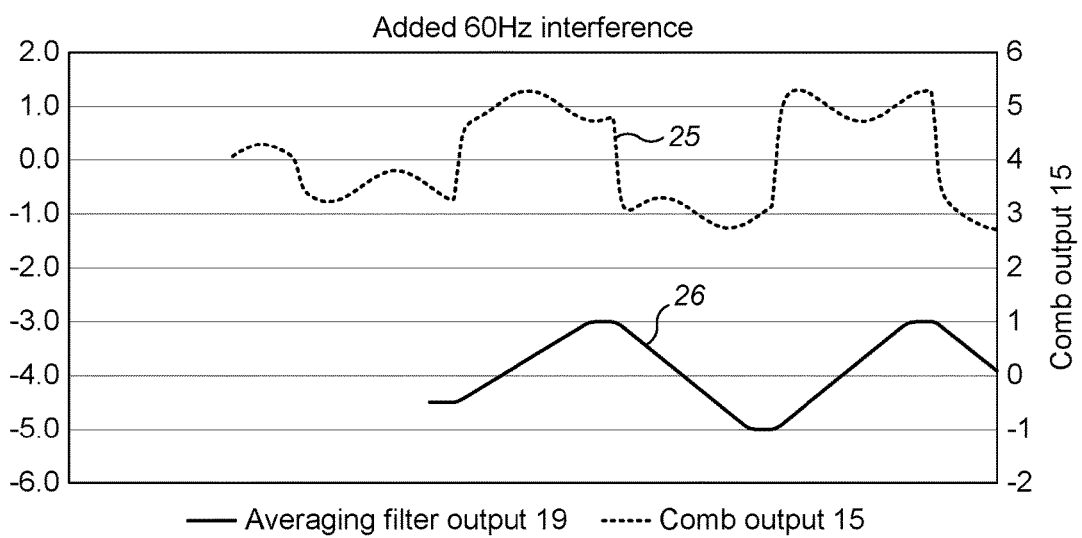
FIG. 7 illustrates the output of the comb filter and also the output of the averaging filter of the interference reduction circuit of FIG. 2, under the same circumstances as discussed above in relation to FIG. 6 (i.e. the flow signal being subjected to 60 Hz interference)

Finally, FIG. 7 (produced under the same circumstances as FIG. 6, i.e. using the interference reduction circuit of FIG. 2 with 60 Hz interference) illustrates the comb filter output signal 25 and also the output signal 26 of the averaging filter 11. The comb filter output signal 25, containing the 60 Hz interference, is processed by the 16.7 ms averaging filter 11 to produce output signal 26. From the output signal 26 it can be seen that the averaging filter 11 has removed all presence of the 60 Hz interference and its harmonics. The resulting amplitude of +/−1 in output signal 26 is the desired value (i.e. corresponding to the initially-generated values of the flow velocity signal as in FIG. 4, before any interference was added).

Although not illustrated, nor is the subject of the present work, the flow velocity signal can be recovered by "traditional" means of synchronous demodulation of the output 19 in FIG. 2 (corresponding to output signal 26), by dividing this signal by the coil current from generator 4 in FIG. 1.

Modifications and Alternatives

Detailed embodiments and some possible alternatives have been described above. As those skilled in the art will appreciate, a number of modifications and further alternatives can be made to the above embodiments whilst still benefiting from the inventions embodied therein.

For instance, there is considerable freedom of choice of coil excitation operating frequencies, the comb filter delay K, the averaging/integrating filter period, and the order of placing the two filters.

For example, in a further embodiment, some benefits in reduction of signal processing can be achieved by placing the averaging filter first. For example, with suitable timing, extracting the averaged input signal near or at the end of the coil excitation sample, a single averaged numeric result is measured. If this is subsequently passed to a comb filter, then only one value need be processed by the comb filter. On the next coil half cycle excitation a simple comb filter subtraction is made of this single value and the single stored value from the previous half cycle. This very simple calculation has both 50 Hz and 60 Hz rejected as above.

It is not necessary for the comb filter to be only arranged to reject 50 Hz, and likewise it is not necessary for the averaging filter to be only arranged to reject 60 Hz. Instead, for example, the comb filter can be arranged to reject 60 Hz, followed by the averaging filter arranged to reject 50 Hz (i.e. averaging for 20 ms). For example the following operating parameters could be used:

coil drive frequency=15 Hz (using equation [1] above, with "mains frequency 1"=60 Hz and taking integer $n$ as being 4)

coil drive half cycle period=33.3 ms comb filter delay $K$=33.3 ms (using equation [2] above)

averaging period of averaging filter=20 ms (using equation [3] above, with "mains frequency 2"=50 Hz and taking integer $m$ as being 1)

In further embodiments, it is not necessary to restrict the type of comb filter to feed forward comb filters. Instead, alternative feedback comb filters, or continuous time comb filters, can be used.

Also, although not expressly illustrated or discussed above, it will be appreciated that the comb filter may apply a scaling factor to the delayed signal, before the delayed signal is combined with (e.g. subtracted from) the input signal.

Also although not expressly illustrated or discussed above, it will be appreciated that the comb filter may be of an additive form defined by:

$$y(n)=x(n)+x(n-N)$$

where:
y(n)=output
x(n)=input
N=delay

The comb filter delay N is then set equal to the coil drive period. That is to say, $$N=1/(\text{coil drive frequency})$$

Whilst the above embodiments used a pulsed DC alternating form of excitation to produce a square wave, in alternative embodiments the same interference reduction principles can be applied to other forms of excitation such as a non 50:50 pulse (e.g. a square wave with a mark to space ratio in which each pulse is "on" for a shorter period of time than it is "off", or vice-versa), a sine wave, a triangular wave, a saw-tooth wave, etc.

Whilst the above embodiments use 50 Hz and 60 Hz as the first and second fundamental frequencies, in respect of which interference is to be reduced, in other embodiments one or both of these frequencies may be different values (provided they are both known in advance, so that the excitation frequency, the delay period of the comb filter, and the averaging period of the averaging/integrating filter may be set as necessary). Indeed, in certain industrial environments interference frequencies other than 50 Hz or 60 Hz may predominate, that the present method and apparatus may be configured to combat.

For example, certain railways (e.g. in Germany, Austria, Switzerland, Sweden and Norway) use traction power networks to distribute single-phase AC at 16.7 Hz, whereas some other railways (e.g. certain narrow-gauge railways in Austria) use 25 Hz power, and thus there may be situations in which a railway-related measurement or sensing device may be prone to interference at one or the other of these frequencies, but the manufacture of the device may not know in advance which of these frequencies it will be. Thus, for such devices, the present interference reduction principles may be employed, based on the first fundamental frequency being 16.7 Hz and the second fundamental frequency being 25 Hz.

SUMMARY

As discussed above, the present work enables periodic (e.g. mains) interference at two different fundamental frequencies (i.e. a first fundamental frequency and a second fundamental frequency) to be removed from a periodic data-carrying signal, which is derived from an excitation signal as in an electromagnetic flowmeter. This is achieved by employing a comb filter 10 in combination with a signal averaging/integrating filter 11. For an electromagnetic flowmeter, the excitation frequency is a sub-multiple of the first fundamental frequency (e.g. a first mains frequency, e.g. 50 Hz); and a comb filter, which subtracts a delayed version of the input signal, removes interference at this first fundamental frequency, together with its associated harmonics. An averaging/integrating filter, whose period is set to a multiple of the second fundamental frequency (e.g. a second mains frequency, e.g. 60 Hz), gives rejection of interference at this second fundamental frequency, together with its associated harmonics.

This allows devices (for example flowmeters) equipped with this signal processing circuitry to be used anywhere in the world, independent of the local mains frequency, without requiring selection of the local mains frequency (either directly, e.g. during manufacture or at the point of installation; or indirectly, e.g. via the selection of the excitation frequency), and without requiring the device to be able to determine the local mains frequency itself.

The present technique also supports high frequency excitation, which would not have been possible if established averaging over 100 ms had been utilised to achieve say 50 Hz and 60 Hz rejection.

The invention claimed is:

1. A method performed by signal processing circuitry of processing a periodic data-carrying signal produced by an electromagnetic flowmeter to reject periodic interference from the data-carrying signal at a first fundamental frequency and a second fundamental frequency, the second fundamental frequency being different from the first fundamental frequency, the periodic data-carrying signal being derived from an excitation signal having an excitation frequency, the excitation frequency being a sub-multiple of the first fundamental frequency, the method comprising:

subjecting the data-carrying signal to a comb filter operation performed by comb filter circuitry to reject interference at the first fundamental frequency and harmonics of the first fundamental frequency;

wherein the comb filter operation has a comb filter delay period related to the first fundamental frequency;

wherein the comb filter operation rejects interference at only the first fundamental frequency and harmonics of the first fundamental frequency;

subjecting the data-carrying signal to an averaging or integrating filter operation performed by averaging or integrating circuitry to reject interference at the second fundamental frequency and harmonics of the second fundamental frequency; and wherein the averaging or integrating filter operation averages or integrates over a period related to the second fundamental frequency.

2. The method as claimed in claim 1, wherein the excitation frequency is given by:

(the first fundamental frequency)/$n$, where n is an integer.

3. The method as claimed in claim 1, wherein the comb filter delay period is given by:

1/(2×the excitation frequency)

or

1/(the excitation frequency).

4. The method as claimed in claim 1, wherein the averaging or integrating filter operation averages or integrates over a period given by:

$m$/(the second fundamental frequency), where m is an integer.

5. The method as claimed in claim 1, wherein the comb filter operation precedes the averaging or integrating filter operation.

6. The method as claimed in claim 1, wherein the averaging or integrating filter operation precedes the comb filter operation.

7. The method as claimed in claim 1, wherein the first fundamental frequency is 50 Hz and the second fundamental frequency is 60 Hz.

8. The method as claimed in claim 1, wherein the first fundamental frequency is 60 Hz and the second fundamental frequency is 50 Hz.

9. The method as claimed in claim 1, wherein the excitation signal has an alternating form, for example a form selected from a group comprising:

a square wave, a non 50:50 pulse, a sine wave, a triangular wave, a saw-tooth wave.

10. The method as claimed in claim 1, wherein the method is performed by said flowmeter.

11. The method as claimed in claim 1, wherein the method is performed by signal processing circuitry separate from said electromagnetic flowmeter.

12. An apparatus comprising signal processing circuitry for processing a periodic data-carrying signal produced by an electromagnetic flowmeter to reject periodic interference from the data carrying signal at a first fundamental frequency and a second fundamental frequency, the second fundamental frequency being different from the first fundamental frequency, the periodic data-carrying signal being derived from an excitation signal having an excitation frequency, the excitation frequency being a sub-multiple of the first fundamental frequency, the apparatus comprising:

comb filter circuitry configured to reject interference from the data-carrying signal at the first fundamental frequency and harmonics of the first fundamental frequency;

wherein the comb filter circuitry has a comb filter delay period related to the first fundamental frequency;

wherein the comb filter operation is configured to reject interference from the data-carrying signal at only the first fundamental frequency and harmonics of the first fundamental frequency;

averaging or integrating filter circuitry in series with the comb filter circuitry, the averaging or integrating circuitry being configured to reject interference at the second fundamental frequency and harmonics of the second fundamental frequency; and wherein the averaging or integrating filter circuitry is configured to average or integrate over a period related to the second fundamental frequency.

13. The apparatus as claimed in claim 12, wherein the excitation frequency is given by:

(the first fundamental frequency)/$n$, where n is an integer.

14. The apparatus as claimed in claim 12, wherein the comb filter delay period is given by:

1/(2×the excitation frequency)

or

1/(the excitation frequency).

15. The apparatus as claimed in claim 12, wherein the averaging/integrating filter circuitry is configured to average or integrate over a period given by:

$m$/(the second fundamental frequency), where m is an integer.

16. The apparatus as claimed in claim 12, wherein the comb filter circuitry precedes the averaging or integrating filter circuitry.

17. The apparatus as claimed in claim 12, wherein the averaging or integrating filter circuitry precedes the comb filter circuitry.

18. The apparatus as claimed in claim 12, wherein the first fundamental frequency is 50 Hz and the second fundamental frequency is 60 Hz.

19. The apparatus as claimed in claim 12, wherein the first fundamental frequency is 60 Hz and the second fundamental frequency is 50 Hz.

20. The apparatus as claimed in claim 12, wherein the excitation signal has an alternating form, for example a form selected from a group comprising:

a square wave, a non 50:50 pulse, a sine wave, a triangular wave, a saw-tooth wave.

21. The apparatus as claimed in claim 12, further comprising a signal generator configured to generate the excitation signal.

22. The apparatus as claimed in claim 21 wherein the apparatus is said electromagnetic flowmeter.

23. The apparatus as claimed in claim 12 being signal processing circuitry operable to receive and process a data-carrying signal produced by said electromagnetic flowmeter.

* * * * *